United States Patent [19]

Zeldov et al.

[11] 4,276,712
[45] Jul. 7, 1981

[54] INSECT ELECTROCUTION APPARATUS

[75] Inventors: Meir Zeldov, Herzlia; Mordechai Yavnieli, Ramat-Hasharom, both of Israel

[73] Assignee: Amcor, Ltd., Tel-Aviv, Israel

[21] Appl. No.: 67,231

[22] Filed: Aug. 16, 1979

[51] Int. Cl.³ ............................................. A01M 1/22
[52] U.S. Cl. ..................................................... 43/112
[58] Field of Search .................. 43/112; 219/383, 384; 55/126, 140, 149

[56] References Cited

U.S. PATENT DOCUMENTS

| | | | |
|---|---|---|---|
| 2,219,743 | 10/1940 | Karr | 43/112 |
| 3,469,031 | 9/1969 | Setchell | 55/140 |
| 4,109,408 | 8/1978 | Yavnieli | 43/112 |

FOREIGN PATENT DOCUMENTS

| | | | |
|---|---|---|---|
| 600065 | 6/1960 | Canada | 43/112 |
| 2811532 | 6/1979 | Fed. Rep. of Germany | 43/112 |
| 1515795 | 1/1968 | France | 43/112 |

Primary Examiner—Nicholas P. Godici
Attorney, Agent, or Firm—Browdy & Neimark

[57] ABSTRACT

Insect electrocution apparatus comprising a housing defining an outward facing direction and an inward facing direction; an inner electrode disposed within the housing; an array of composite members disposed within the housing and spaced in an outward facing direction with respect to the inner electrode, the composite members each comprising an outward facing insulative member defining a safety guard and fixed thereto an inward facing conductor, defining an outer electrode array, and means for coupling the inner electrode and the outer electrode array across a high voltage source.

7 Claims, 4 Drawing Figures

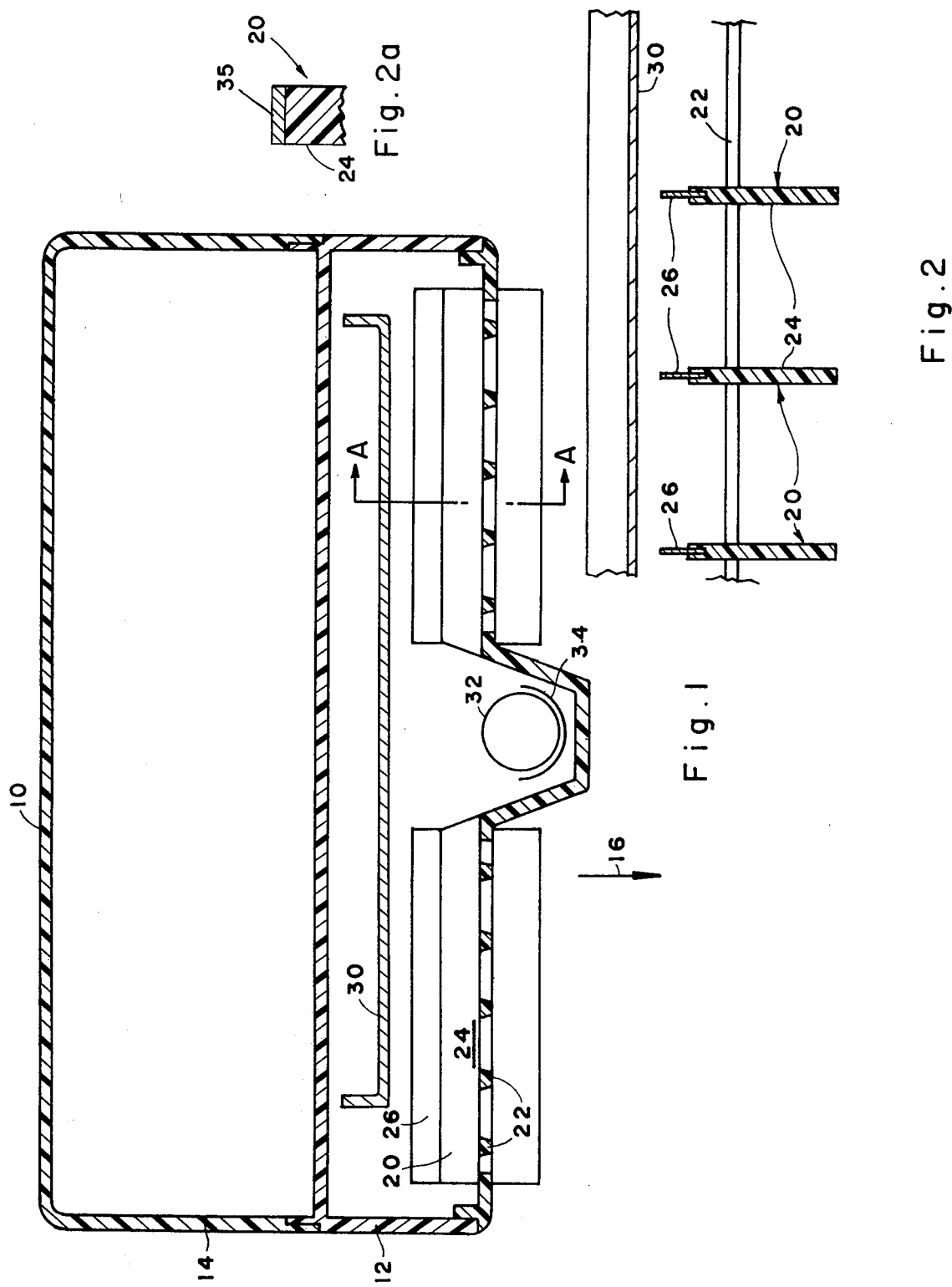

INSECT ELECTROCUTION APPARATUS

The present invention relates to insect electrocution apparatus.

Many types of insect electrocution devices are presently known and found on the market. Most of these operate by producing an electrical arc across the insect's body when the insect is located between two high voltage electrodes. Since voltages of the order of 5000 volts are employed, it is customary to provide a protective shield or grid which permits insect entry but prevents inadvertent contact with the high voltage electrodes by humans or domestic animals. Insect electrocution devices are also known which employ a grounded outer grid as one of the high voltage electrodes, thus obviating the need for another protective grid.

There is disclosed in U.S. Pat. No. 4,109,108 which issued on Aug. 29, 1978 and is assigned to the assignee of this invention; an insect electrocution device comprising a planar electrode and an array of electrodes spaced therefrom. While the disclosed device is eminently suitable as an insect electrocution device, it also requires a protective grid or guard to prevent accidental electrocution.

The present invention seeks to provide an insect electrocution device which eliminates the need for a separate protective shield while not requiring the use of an outer grounded electrode.

There is thus provided in accordance with an embodiment of the invention insect electrocution apparatus comprising:

a housing defining an outward facing direction and an inward facing direction;

an inner electrode disposed within said housing;

an array of composite members disposed within said housing and spaced in an outward facing direction with respect to said inner electrode, said composite members comprising an outward facing insulative member defining a safety guard and, fixed thereto, an inward facing conductor, defining an outer electrode array, and means for coupling said inner electrode and said outer electrode array across a high voltage source.

In accordance with a preferred embodiment of the invention, the insect electrocution apparatus comprises a generally planar inner electrode.

Further in accordance with an embodiment of the invention, the generally planar inner electrode serves as a light reflector to aid in attracting insects to the apparatus. The inner electrode may be formed for a patterned, conditioned or embossed surface to provide a desired pattern of reflected light.

Additionally in accordance with an embodiment of the invention the outer electrode array may comprise a foil or plated layer mounted on the insulative member.

The invention will be more fully understood and appreciated from the following detailed description taken in conjunction with the drawings in which:

FIG. 1 is a sectional illustration of insect electrocution apparatus constructed and operative in accordance with an embodiment of the invention;

FIG. 2 is a sectional illustration of electrodes forming part of the insect electrocution apparatus of FIG. 1 and taken along the lines A—A of FIG. 1;

FIG. 2a is a detailed view of another embodiment of the outer electrode array first shown in FIG. 2.

Figure 3:
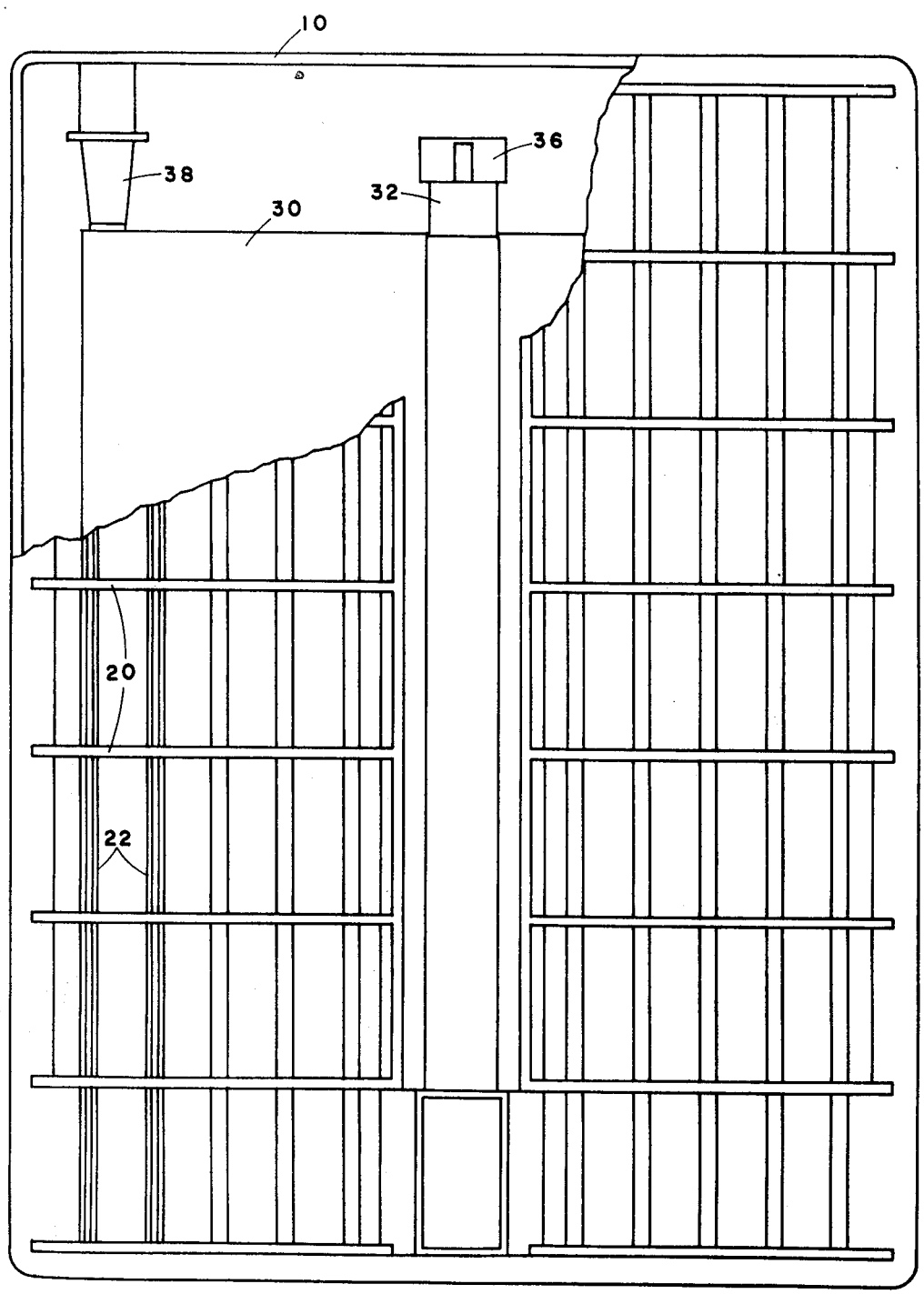
FIG. 3 is a partially cut away front plan view of the insect electrocution apparatus of FIGS. 1 and 2.

Referring now to FIGS. 1-3 there is seen insect electrocution apparatus constructed and operative in accordance with an embodiment of the invention and comprising a housing 10. Housing 10 is typically formed of a plastics material and comprises a forward portion 12 and a rearward portion 14. Forward portion 12 faces in an outward facing direction, indicated by an arrow 16. The direction opposite to the outward facing direction indicated by arrow 16 is termed the inward facing direction.

Disposed at the front of forward portion 12 is a grid formed of a plurality of generally uniformly spaced composite members 20 which are supported on generally uniformly spaced insulative support members 22. In the preferred embodiment of the invention illustrated herein both members 20 and 22 are of generally elongate configuration. According to alternative embodiments of the invention, members 20 and 22 need not necessarily be elongate and may be of any suitable configuration.

Composite members 20 comprise a generally flat, thin guard portion 24, formed of an insulator. Imbedded on the inward facing edge of portion 24 is an elongate electrode portion 26, formed of a conductor and typically joined to portion 24 by glueing, moulding or by any other suitable means. The width of guard portions 24 along the axis defined by arrow 16 and the separation between adjacent composite members and support members are selected to ensure that a human or animal appendage cannot normally extend therepast and into contact with electrode portion 26.

As seen in FIG. 3 composite members 20 are arranged in a generally parallel array and are joined by transverse composite members at the inside edges of two sides of the electrocution apparatus. Thus the composite members simultaneously define a protective safety guard and an electrode array. The electrode array defined by portions 26 lies generally in a single plane.

A planar inner electrode 30 is disposed in a plane extending generally parallel to the plane of electrode array 26 and spaced therefrom in an inward facing direction, opposite to that indicated by arrow 16. The distance between the two planes is selected, in accordance with a preferred embodiment of the invention, to be less than the distance separating adjacent electrode portions 26 forming the electrode array.

According to an alternative embodiment of the invention; the inner electrode 30 need not be a planar electrode and can be formed of any suitable configuration.

In accordance with a preferred embodiment of the invention, the inner electrode may be formed with a conditioned surface to provide desired light reflectivity characteristics. For example, the inner electrode 30 may be corrugated or suitably embossed to provide alternating or interspersed light and dark areas which are believed to assist in attracting certain types of insects.

The inner electrode 30 is illuminated by a light source 32, typically a flourescent lamp, which is typically arranged between halves of the apparatus. According to one embodiment of the invention direct illumination from light source 32 in the outward facing direction indicated by arrow 16 is prevented by a shield 34 disposed about a portion, typically one-half, of the lamp. According to another embodiment of the invention, the light source is not shielded and thus both direct illumination and light reflected by the inner electrode 30 is provided in the outward-facing direction.

Light source 32 is mounted in a conventional lampholder 36 which is electrically coupled to a power source, such as a transformer (not shown) conveniently located in the rearward portion 14 of the housing. Electrode portions 26 and planar electrode 30 are also coupled to a suitable power source, such as a transformer (not shown) which provides an output of approximately 5000 V AC or DC thereacross. Planar electrode 30 is mounted on connectors 38 onto the housing 10.

According to an alternative embodiment of the invention composite members 20 may be formed by plating a conductive film on an insulator. In such a case portion 26 may be omitted and replaced by a suitably configured plated extension 35 of portion 24. (Shown in FIG. 2a). A conductive foil may be employed similarly.

In accordance with the preferred embodiment of the invention illustrated in the drawing composite members 20 are spaced from each other by 30 mm. The inner facing edge of portion 26 is spaced from the planar electrode 30 by 4–6 mm and is maintained typically at 4000 V. Members 22 are spaced from each other by 11 mm and from the planar electrode by 20 mm.

It will be appreciated by persons skilled in the art that the invention is not limited to what has been specifically shown and described hereinabove. Rather the scope of the invention is defined only by the claims which follow:

We claim:

1. Insect electrocution apparatus comprising:
   a housing defining an outward facing direction and an inward facing direction;
   an inner electrode disposed within said housing;
   an array of composite members spaced in an outward facing direction with respect to said inner electrode, and adapted for entrance of insects between elements of said array,
   said composite members each comprising an outward facing member fabricated from insulative material defining a safety guard and fixed thereto an inwardly facing conductor, defining an element of an outer electrode array, and
   means for coupling said inner electrode and said outer electrode array across a high voltage source.

2. Insect electrocution apparatus according to claim 1 and wherein said inner electrode comprises a sheet electrode.

3. Insect electrocution apparatus according to claim 2 and also comprising means for illuminating said inner electrode to provide reflected light in said outward facing direction.

4. Insect electrocution apparatus according to claim 3 and wherein said inner electrode is formed to have a conditioned surface so as to provide a non-uniform pattern of reflected light.

5. Insect electrocution apparatus according to claim 1 and comprising a plurality of said arrays of composite members with each array having an outward facing direction defined with respect thereto.

6. Insect electrocution apparatus according to claim 1 wherein said inner facing conductor comprises a metal strip embedded in said outward facing member.

7. Insect electrocution apparatus according to claim 1 wherein said inner facing conductor comprises a thin metal layer plated onto said outward facing member.

* * * * *